(12) United States Patent
Kim et al.

(10) Patent No.: US 9,891,367 B2
(45) Date of Patent: Feb. 13, 2018

(54) BACKLIGHT UNIT AND DISPLAY DEVICE INCLUDING THE SAME

(71) Applicant: SAMSUNG DISPLAY CO., LTD., Yongin-si (KR)

(72) Inventors: Dawoon Kim, Seoul (KR); Donghoon Kim, Suwon-si (KR); Seunghwan Chung, Asan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 132 days.

(21) Appl. No.: 14/933,212

(22) Filed: Nov. 5, 2015

(65) Prior Publication Data

US 2016/0313495 A1    Oct. 27, 2016

(30) Foreign Application Priority Data

Apr. 21, 2015   (KR) ................. 10-2015-0056182

(51) Int. Cl.
*F21V 8/00* (2006.01)

(52) U.S. Cl.
CPC ......... *G02B 6/0038* (2013.01); *G02B 6/0016* (2013.01); *G02B 6/0036* (2013.01); *G02B 6/0058* (2013.01); *G02B 6/0068* (2013.01); *G02B 6/0073* (2013.01)

(58) Field of Classification Search
CPC .. G02B 6/0038; G02B 6/0016; G02B 6/0036; G02B 6/0058; G02B 6/0068; G02B 6/0073; G02B 6/0033; G02B 6/0035; G02B 6/0011; F21V 2200/20; G02F 1/133615
See application file for complete search history.

(56) References Cited

U.S. PATENT DOCUMENTS

| 2009/0167988 | A1 | 7/2009 | Sung |
| 2015/0293296 | A1* | 10/2015 | Kikuchi ............... G02B 6/0051 362/606 |

FOREIGN PATENT DOCUMENTS

| KR | 1020090073886 | 7/2009 |
| KR | 1020140024576 | 3/2014 |
| KR | 1020140086503 | 7/2014 |
| KR | 101385482 | 9/2014 |

* cited by examiner

*Primary Examiner* — Bao Q Truong
(74) *Attorney, Agent, or Firm* — Cantor Colburn LLP

(57) ABSTRACT

A backlight unit includes: a lower case including a bottom portion and a side portion on an edge of the bottom portion, a light guide plate accommodated in the lower case, and a light source module including a circuit board between the light guide plate and the side portion of the lower case and a light source on the circuit board, where the light guide plate includes a first light collecting pattern on a lower surface of the light guide plate, and a second light collecting pattern on the lower surface of the light guide plate and between the light source module and the first light collecting pattern.

19 Claims, 9 Drawing Sheets

BACKLIGHT UNIT AND DISPLAY DEVICE INCLUDING THE SAME

This application claims the priority to Korean Patent Application No. 10-2015-0056182, filed on Apr. 21, 2015, and all the benefits accruing therefrom under 35 U.S.C. § 119, the content of which in its entirety is herein incorporated by reference.

BACKGROUND

1. Field

Embodiments of the invention relate to a backlight unit and a display device including the backlight unit, and more particularly, to a backlight unit capable of mitigating a hot spot phenomenon that occurs in a light incident portion of a light guide plate as the number of light sources decreases, and a display device including the backlight unit.

2. Description of the Related Art

Display devices are typically classified into various types including a liquid crystal display ("LCD") device, an organic light emitting diode ("OLED") display device, a plasma display panel ("PDP") device, an electrophoretic display ("EPD") device, and the like, based on a light emitting scheme thereof.

Such an LCD device includes a backlight unit for light emission. A backlight unit may be disposed below an LCD panel, and is classified into a direct-type backlight unit, an edge-type backlight unit, and a corner-type backlight unit based on a position of a light source.

In recent, various attempts to simplify a structure of a backlight unit are being made to reduce manufacturing costs thereof. One of the attempts may include reducing the number of light emitting diodes ("LED") used as a light source. However, the reduced number of LEDs may lead to an increasing gap between the LEDs, such that a dark area may be increased therein.

Accordingly, reducing such a dark area and enhancing a light collecting performance may be significant.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments of the invention are directed to a backlight unit capable of reducing a dark area, which increases as the number of light sources decreases, and capable of mitigating a hot spot phenomenon occurring due to the increasing dark area, and a display device including the backlight unit.

According to an exemplary embodiment of the invention, a backlight unit includes: a lower case including a bottom portion and a side portion on an edge of the bottom portion; a light guide plate accommodated in the lower case; and a light source module including a circuit board between the light guide plate and the side portion of the lower case and a light source on the circuit board, where the light guide plate includes: a first light collecting pattern on a lower surface of the light guide plate; and a second light collecting pattern on the lower surface of the light guide plate and between the light source module and the first light collecting pattern.

In an exemplary embodiment, the first light collecting pattern may have at least a first groove defined in a negative pattern, and the second light collecting pattern has at least a second groove defined in a negative pattern.

In an exemplary embodiment, the first groove may have a depth less than a depth of the second groove.

In an exemplary embodiment, the light source module may include a plurality of light sources, and the second groove may be disposed between adjacent light sources.

In an exemplary embodiment, the second grooves may be arranged in a triangular shape when viewed from a plan view.

In an exemplary embodiment, the second grooves may be arranged in a manner in which a number of the second grooves decreases as being further away from the light source module.

In an exemplary embodiment, the second groove may have a circular cone shape.

In an exemplary embodiment, the second groove may have an oblique circular cone shape.

In an exemplary embodiment, a vertex of the second groove may be positioned between a center of a base of the oblique circular cone shape and the light source module.

In an exemplary embodiment, the second groove may have a polygonal pyramid shape.

In an exemplary embodiment, the second groove may have a truncated cone or pyramid shape.

In an exemplary embodiment, the first groove may be divided into a lower portion having a cylindrical shape and an upper portion having a semi-spherical shape, based on the lower surface of the light guide plate.

In an exemplary embodiment, the first grooves may be arranged in an irregular manner when viewed from a plan view.

According to another exemplary embodiment of the invention, a display device includes: an upper case; a display panel below the upper case; an optical sheet below the display panel; an intermediate case in which the display panel and the optical sheet are accommodated; a lower case including a side portion coupled to the intermediate case; a light guide plate accommodated in the lower case; and a light source module including a circuit board between the light guide plate and the side portion of the lower case and a light source on the circuit board, where the light guide plate includes: a first light collecting pattern on a lower surface of the light guide plate; and a second light collecting pattern on the lower surface of the light guide plate and between the light source module and the first light collecting pattern.

In an exemplary embodiment, the first light collecting pattern may have a first groove defined in a negative pattern, and the second light collecting pattern may have a second groove defined in a negative pattern.

In an exemplary embodiment, the first groove may have a depth less than a depth of the second groove.

In an exemplary embodiment, the light source module may include a plurality of light sources, and the second groove may be disposed between adjacent light sources.

In an exemplary embodiment, the second groove may have a circular cone shape.

In an exemplary embodiment, the second groove may have an oblique circular cone shape, and a vertex of the second groove may be positioned between a center of a base of the oblique circular cone shape and the light source module.

In an exemplary embodiment, the first groove may be divided into a lower portion having a cylindrical shape and an upper portion having a semi-spherical shape, based on the lower surface of the light guide plate.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the disclosure of invention will be more clearly understood from the following detailed description taken in conjunction with the accompanying drawings, in which.

DETAILED DESCRIPTION

Figure 1:
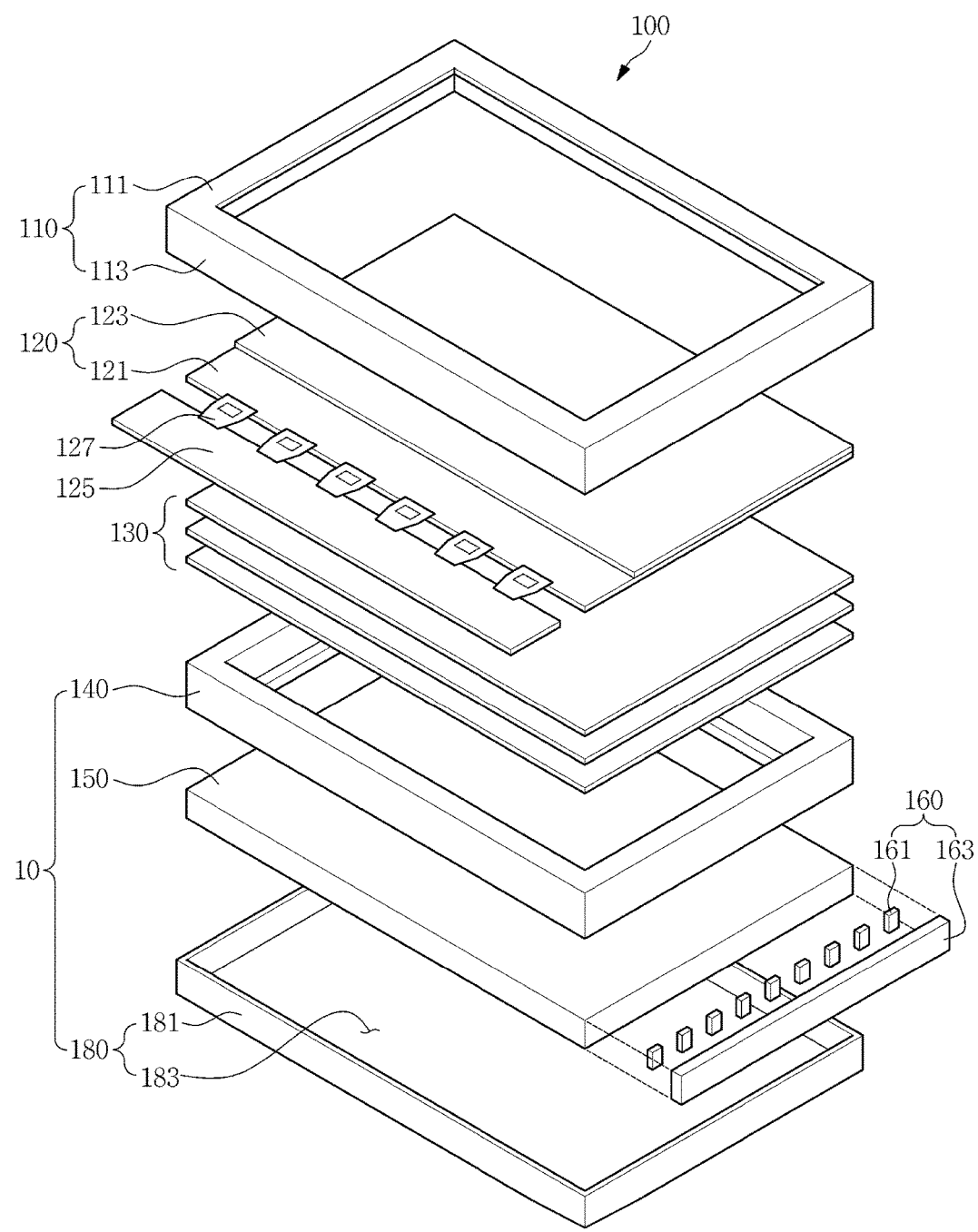
FIG. 1 is an exploded perspective view a display device including a backlight unit, according to an exemplary embodiment of the invention.

Exemplary embodiments will now be described more fully hereinafter with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art.

In the drawings, certain elements or shapes may be simplified or exaggerated to better illustrate the invention, and other elements in an actual product may also be omitted. Thus, the drawings are intended to facilitate the understanding of the invention. Like reference numerals refer to like elements throughout the specification.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

When a layer or element is referred to as being "on" another layer or element, the layer or element may be directly on the other layer or element, or one or more intervening layers or elements may be interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

FIG. 1 is an exploded perspective view illustrating a display device 100 including a backlight unit 10, according to an exemplary embodiment.

Referring to FIG. 1, an exemplary embodiment of the display device 100 may include an upper case 110, a display panel 120, an optical sheet 130, an intermediate case 140, a light guide plate 150, a light source module 160 and a lower case 180.

In such an embodiment, of the display device 100, the backlight unit 10 may include or be defined by the intermediate case 140, the lower case 180, the light guide plate 150 including a first light collecting pattern 200 and a second light collecting pattern 300, and the light source module 160.

An opening may be defined through the upper case 110, and an active area of the display panel 120 is exposed outwardly through the opening. The upper case 110 may be disposed to cover an upper edge (e.g., a top edge) and a side surface of the display panel 120.

The upper case 110 may include a bezel portion 111 covering the upper edge of the display panel 120, and may include a side wall portion 113 bent downwardly from the bezel portion 111 to cover the side surface of the display panel 120.

The bezel portion 111 may fix the upper edge of the display panel 120 to prevent the escape of the display panel 120 from the backlight unit 10. The side wall portion 113 may be connected or fixed to the intermediate case 140 and the lower case 180. In one exemplary embodiment, for example, the side wall portion 113 may be fixed to the intermediate case 140 and the lower case 180 through hook coupling and/or screw coupling.

The upper case 110 may include or be formed of a metal material having rigidity such as stainless steel, or a material having high heat dissipation properties such as aluminum (Al) or an Al alloy.

The display panel 120 may have a quadrangular planar shape and display an image using light from a light source. The display panel 120 may include a first substrate 121, a second substrate 123 disposed opposite to the first substrate 121, and a liquid crystal layer (not illustrated) disposed between the first and second substrates 121 and 123.

The first substrate 121 may include a plurality of pixel electrodes arranged substantially in a matrix form, a thin film transistor that applies a driving voltage to each of the pixel electrodes, and various signal wirings for driving the pixel electrode and the thin film transistor.

The second substrate 123 may be disposed to oppose the first substrate 121, and may include a common electrode including or formed of a transparent conductive material, and a color filter. The color filter may include red, green and blue color filters, for example, but not being limited thereto.

The liquid crystal layer (not illustrated) may be interposed between the first and second substrates 121 and 123, and may be rearranged by an electric field formed between the pixel electrode and the common electrode. The rearranged liquid crystal layer may adjust a level of transmittance of light emitted from the backlight unit 10, the light having the adjusted level of transmittance may pass through the color filter, and an image may be thereby displayed outwardly.

Although not illustrated, in an exemplary embodiment, the display device 100 may further include a lower polarizing plate and an upper polarizing plate, which are disposed on a lower surface of the first substrate 121 and an upper surface of the second substrate 123, respectively. The upper polarizing plate and the lower polarizing plate may each have an area corresponding to an area of the display panel 120. The upper polarizing plate may allow a predetermined component of incident light (e.g., an externally supplied light) to pass therethrough, and may absorb or block the other components of the incident light. The lower polarizing plate may allow a predetermined component of incident light (e.g., light emitted from the backlight unit 10) to pass therethrough, and may absorb or block the other components of the incident light.

A driving circuit board 125 may be disposed at a side of the display panel 120. The driving circuit board 125 may be connected to the display panel 120 by a driving chip 127. The driving circuit board 125 may apply a driving signal to various signal wirings disposed on the first substrate 121.

The driving circuit board 125 may include a gate driving circuit board that applies a scan signal and a data driving circuit board that applies a data signal. In an exemplary embodiment, as shown in FIG. 1, the driving circuit board 125 may be disposed at a single side of the display panel 120, but the disposition of the driving circuit board 125 is not necessarily limited thereto.

The optical sheet 130 may be disposed below the display panel 120, and may diffuse or collect light transmitted from the light guide plate 150, as described below. The optical sheet 130 may include a diffusion sheet, a prism sheet, and a protective sheet. In one exemplary embodiment, for example, the optical sheet 130 may include three layers as shown in FIG. 1, but not being limited thereto. In an alternative exemplary embodiment, the number of the layers of the optical sheet 130 may be two, or four or more.

The diffusion sheet may diffuse light incident thereon from the light guide plate 150 to thereby prevent the light from being partially concentrated.

In an exemplary embodiment, the prism sheet may include trigonal prisms arranged on a surface thereof in a predetermined manner. In such an embodiment, the prism sheet may be disposed on the diffusion sheet to collect the light diffused from the diffusion sheet on to the display panel 120 in a direction perpendicular to the display panel 120.

The protective sheet may be disposed on the prism sheet, may protect a surface of the prism sheet, and may diffuse light to achieve a uniform distribution of light.

In an exemplary embodiment, the intermediate case 140 may have a quadrangular shape, and may include a penetration area therein. In such an embodiment, the intermediate case 140 may have a quadrangular loop shape. The intermediate case 140 may accommodate the display panel 120, the optical sheet 130, the light guide plate 150, and the like, which are supported therein. In one exemplary embodiment, for example, the intermediate case 140 may be provided in a single unit or integrally formed as a single unitary and indivisible unit, as illustrated in FIG. 1. In an alternative exemplary embodiment, the intermediate case 140 may include a plurality of portions to be subsequently assembled therefrom.

The lower case 180 may include a bottom portion 183 and a side portion 181. The bottom portion 183 may have a flat surface, and the side portion 181 may be connected to an edge of the bottom portion 183. In an exemplary embodiment, the side portion 181 may be bent from the edge of the bottom portion 183 in a direction, for example, an upward direction in FIG. 1. In such an embodiment, the side portion 181 may be substantially perpendicular to the bottom portion 183. Accordingly, an accommodation space may be defined by the bottom portion 183 and the side portion 181 of the lower case 180.

The lower case 180 may include or be formed of a metal having high rigidity such as stainless steel, or a material having high heat dissipation properties such as aluminum (Al) or an Al alloy. The lower case 180 may maintain a framework of the display device 100, and may protect various components accommodated therein.

The light guide plate 150 may be accommodated in a space defined by the lower case 180 therebelow and the intermediate case 140 thereabove and supported by the lower case 180 or the intermediate case 140. In such an embodiment, the light guide plate 150 may have a side facing the light source module 160 which will be described later in detail. The light guide plate 150 may have a quadrangular planar shape; however, the shape of the light guide plate 150 is not limited thereto. According to exemplary embodiments, the light guide plate 150 may have various shapes including, for example, a predetermined groove or protrusion, based on a position of the light source module 160. The light guide plate 150 may uniformly supply light supplied from the light source 161 to the display panel 120.

Herein, the light guide plate 150 is described as having a planar shape, that is, a plate, for convenience of description. According to alternative exemplary embodiments, the light guide plate 150 may have a sheet or film shape to achieve slimness of the display device 100. The light guide plate 150 is to be understood as concept light guide unit that includes not only a plate but also a film for guiding light.

The light guide plate 150 may include or be formed of a light-transmissive material, for example, an acrylic resin such as poly(methyl methacrylate) ("PMMA") or polycarbonate ("PC") to improve the efficiency of the guided light.

In an exemplary embodiment, although not illustrated, a reflective sheet may be interposed between the light guide plate 150 and the lower case 180. The reflective sheet may reflect light dissipated downwardly from the light guide plate 150 to be directed toward the display panel 120 to enhance light efficiency.

The light source module 160 may be interposed between the side portion 181 of the lower case 180 and a side of the light guide plate 150. In such an embodiment, the light source module 160 may include the circuit board 163 and the light source 161.

The circuit board 163 may have a rectangular planar shape, and may be interposed between the side portion 181 of the lower case 180 and a side of the light guide plate 150. Accordingly, the circuit board 163 may face the side of the light guide plate 150. The circuit board 163 may be a printed circuit board ("PCB") or a metal printed circuit board ("MPCB"), for example.

The light source 161 may be disposed on the circuit board 163. The light source 161 may emit light toward the light guide plate 150. The light source 161 may include a light emitting diode ("LED") chip (not illustrated) and a package (not illustrated) for accommodating the LED chip therein. For example, the LED chip may be a gallium nitride (GaN)-based LED chip emitting blue light.

In an exemplary embodiment, the light source module 160 may include a plurality of light sources 161. In such an embodiment, the number of the light sources 161 may vary based on, for example, a size and luminance uniformity, of the display panel 120. In such an embodiment, the light sources 161 may be linearly arranged in a length direction of the circuit board 163, as shown in FIG. 1.

Although not illustrated in FIG. 1, a heat dissipation member may be interposed between the light source module 160 and the lower case 180. The heat dissipation member may externally dissipate heat generated in the light source 161. In an exemplary embodiment, in which the light source module 160 is disposed on a side surface of the lower case 180 in a bar or line shape, the heat dissipation member may include a metal frame having a bar or line shape corresponding to the shape of the light source module 160. In an exemplary embodiment, the heat dissipation member may have various shapes based on the shape of the light source module 160.

Figure 2:
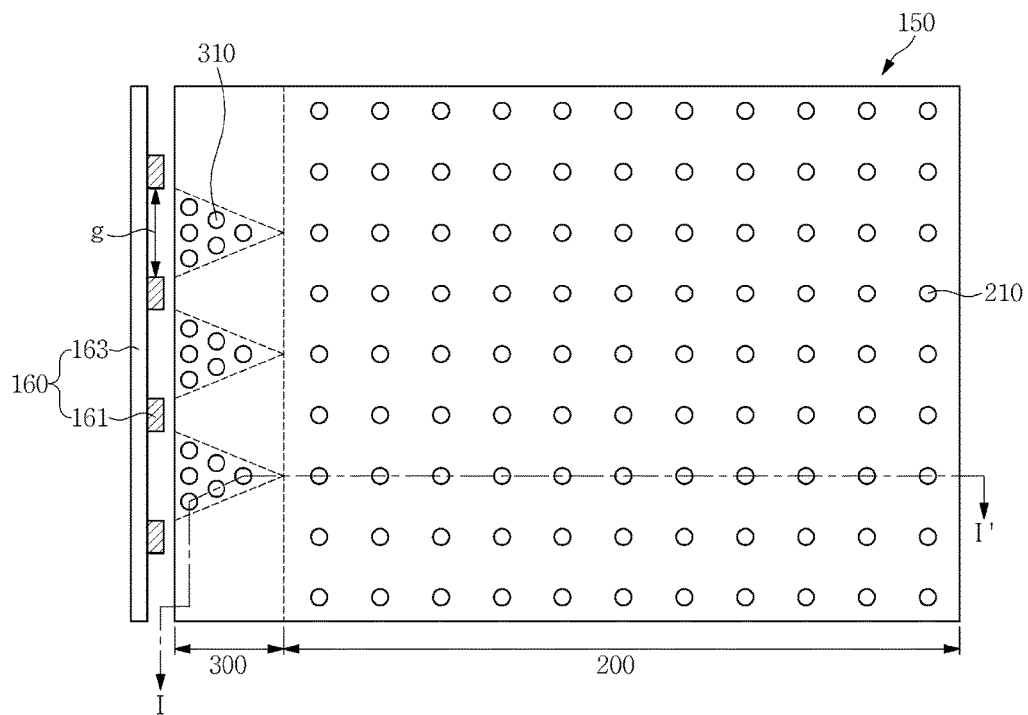
FIG. 2 is a bottom view illustrating an exemplary embodiment of a light source module and a light guide plate of FIG. 1.
Figure 3:
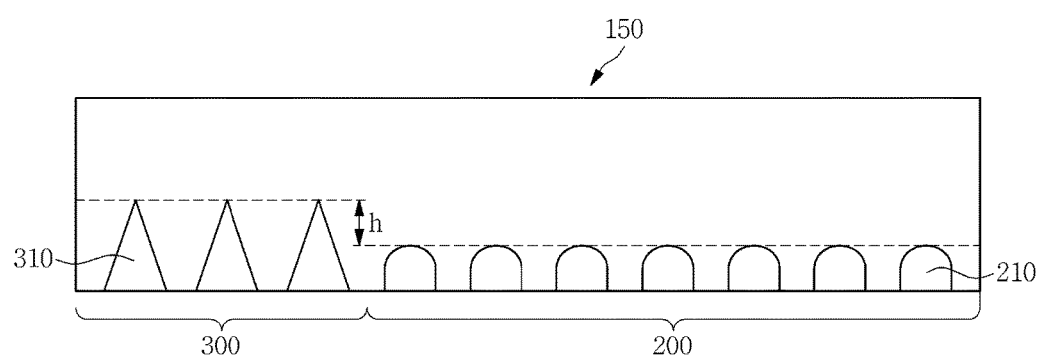
FIG. 3 is a cross-sectional view taken along line I-I' of FIG. 2.

Hereinafter, the first light collecting pattern 200 and the second light collecting pattern 300 will be described in greater detail with reference to FIGS. 2 and 3. FIG. 2 is a bottom view illustrating the light source module 160 and the light guide plate 150 of FIG. 1, and FIG. 3 is a cross-sectional view taken along line I-I' of FIG. 1.

Referring to FIG. 2, the first light collecting pattern 200 and the second light collecting pattern 300 may be disposed on a lower surface of the light guide plate 150. The first light collecting pattern 200 may be positioned to be spaced apart from the light source module 160 at a predetermined distance, and may be defined on substantially an entire surface of the light guide plate 150. The second light collecting pattern 300 may be defined between the light source module 160 and the first light collecting pattern 200.

The first light collecting pattern 200 and the second light collecting pattern 300 may be a negative or positive pattern.

In an exemplary embodiment, where the first light collecting pattern 200 or the second light collecting pattern 300 is the positive pattern, an additional spacer (not illustrated) may be disposed between the light guide plate 150 and the reflective sheet (not illustrated) or the lower case 180 which is disposed below the light guide plate 150 to maintaining an interval therebetween.

In an exemplary embodiment, where the first light collecting pattern 200 or the second light collecting pattern 300 is the negative pattern, the negative pattern may be provided or formed through being printed on the lower surface of the light guide plate 150, or may be formed through an imprinting process including a laser processing. In such an embodiment, the negative pattern may be formed by forming a positive pattern on an inner surface of a mold for injecting the light guide plate 150.

According to an exemplary embodiment, the first light collecting pattern 200 may have a first groove 210, and the second light collecting pattern 300 may have a second groove 310. Referring to FIG. 3, the first groove 210 may have a depth less than that of the second groove 310. Such a depth difference 'h' between the first groove 210 and the second groove 310 may allow light reflected or dispersed through the first groove 210 to be directed upwardly toward the light guide plate 150.

In an exemplary embodiment, as shown in FIG. 3, the first light collecting pattern 200 may have a plurality of first grooves 210 having the same depth as one another, but the depth of the first groove 210 is not limited thereto. In an alternative exemplary embodiment, the plurality of first grooves 210 may be formed to have different depths from one another. In such an embodiment, an amount of light incident on the light guide plate 150 to be dispersed or reflected may be increased based on the depth of the first groove 210.

In an exemplary embodiment, as shown in FIGS. 2 and 3, the second groove 310 may have a circular cone shape, but the shape of the second groove 310 is not limited thereto. FIGS. 4A, 4B, 4C, 5A, 5B, 6A, and 6B are views illustrating second grooves 310 according to various exemplary embodiments, respectively. As used herein, left and right directions are defined based on each of the drawings, that is, the left direction is a direction toward the light source module 160, and the right side is the direction away from the light source module 160, as shown in FIGS. 2 and 4D.

Figure 4A:
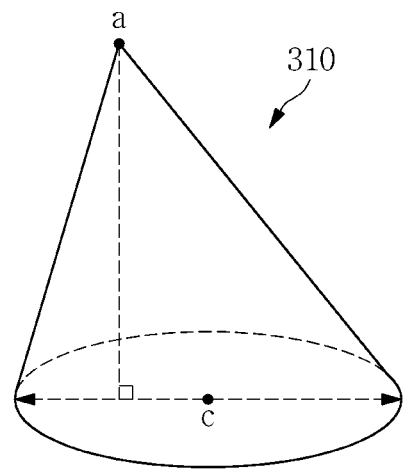
FIGS. 4A, 4B, 4C, 5A, 5B, 6A and 6B are views illustrating exemplary embodiments of a second groove, according to various exemplary embodiments of the invention, respectively.
Figure 4B:
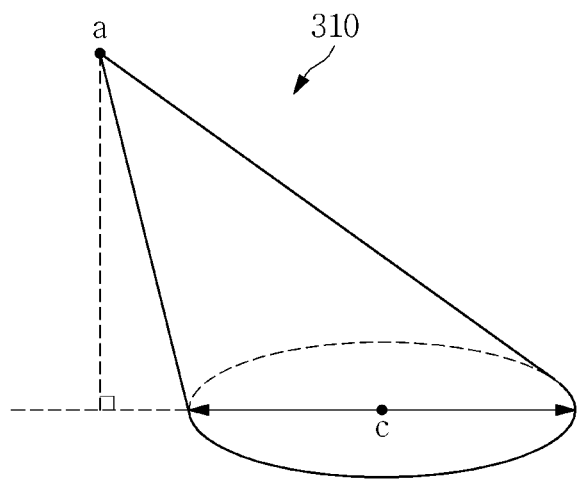
Figure 4C:
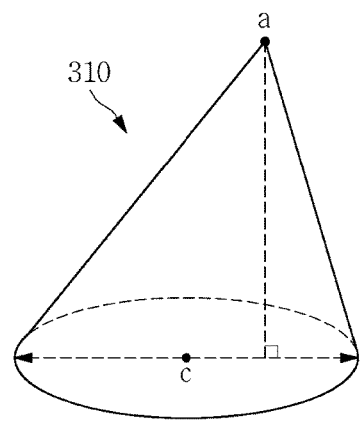

Referring to FIGS. 4A, 4B and 4C, in an exemplary embodiment, a second groove 310 may have an oblique circular cone shape. Accordingly, a light guide plate 150 may have the second groove 310 having the oblique circular cone shape. The second groove 310 may have a circular base and a vertex 'a' having a predetermined height from the base. In such an embodiment, the shape of the second groove 310 may vary based on a position of the vertex 'a'.

Referring to FIGS. 4A and 4B, in an exemplary embodiment, the vertex 'a' may be positioned to be slanted to left based on a center 'c' of the base of the second groove 310. Accordingly, a left slant of the second groove 310 may be steeper than a right slant thereof based on the vertex 'a'. In particular, the vertex 'a' of FIG. 4B may be more slanted to left than the vertex 'a' of FIG. 4A is. Accordingly, the second groove 310 illustrated in FIG. 4B may have a relatively mild right slant based on the vertex 'a'.

Figure 4D:
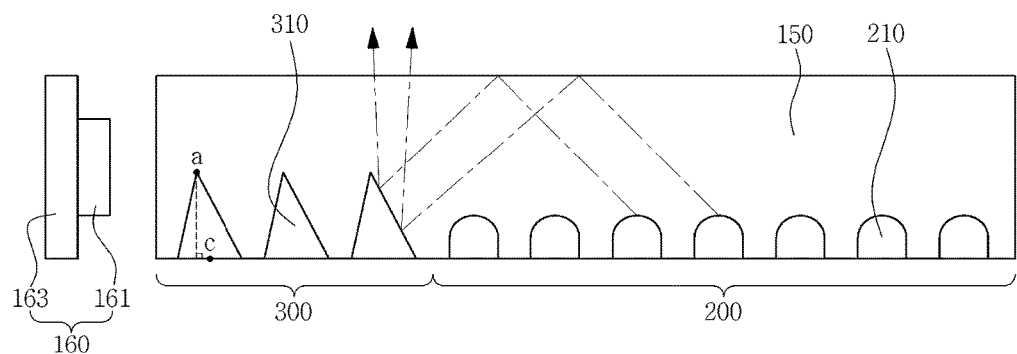
FIG. 4D is a view illustrating a path of light.

FIG. 4D is a view illustrating a path of light. Referring to FIG. 4D, in an exemplary embodiment in which a vertex 'a' is slanted to left based on a center 'c' of a base of a second groove 310 having an oblique circular cone shape, the second groove 310 may increase an amount of light directed upwardly toward a light guide plate 150 from among light dispersed from a first groove 210. Accordingly, in such an embodiment, the vertex 'a' may be disposed between the center 'c' of the base of the oblique circular cone shape and a light source module 160.

However, the position of the vertex 'a' is not limited to those shown in FIGS. 4A and 4B. Referring to FIG. 4C, in an alternative exemplary embodiment, a vertex 'a' may be slanted to right based on a center 'c' of a base of a second groove 310. In such an embodiment, a right side of the second groove 310 may have a slant based on the vertex 'a' due to the characteristic of an oblique circular cone. Accordingly, in such an embodiment, light dispersed from a first groove 210 may be directed toward a display panel 120 disposed upwardly of a light guide plate 150, as in an exemplary embodiment including the second groove 310 illustrated in FIGS. 4A and 4B.

In an exemplary embodiment, the plurality of second grooves 310 may have a second groove 310 having a circular cone shape and a second groove 310 having an oblique circular cone shape.

Figure 5A:
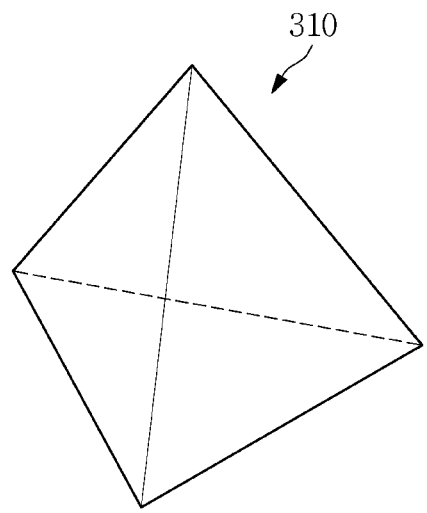

Hereinafter, second grooves 310 according to various alternative exemplary embodiments will be described with reference to FIGS. 5A, 5B, 6A and 6B, respectively. In such embodiments, the second groove 310 may have a polygonal pyramid shape. Referring to FIG. 5A, in an exemplary embodiment, the second groove 310 may have a tetrahedron shape including four triangular-shaped surfaces. In such an embodiment, the second groove 310 may have a triangular pyramid shape.

In such an embodiment, where the second groove 310 has the triangular pyramid shape, light reflected or dispersed from a first groove 210 may be re-reflected or re-dispersed from a surface of the triangular pyramid shape to be dissipated upwardly through a light guide plate 150.

Figure 5B:
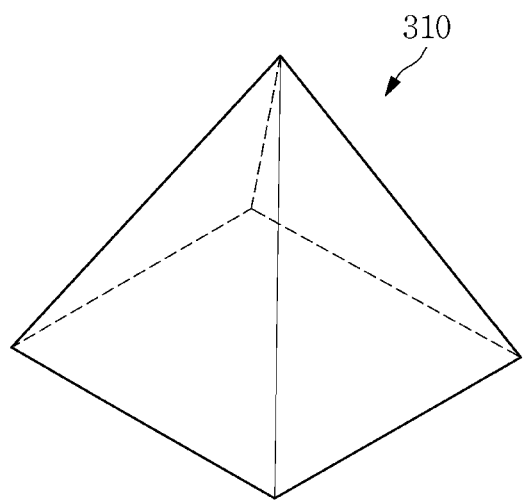

Referring to FIG. 5B, in an alternative exemplary embodiment, a second groove 310 may have a quadrangular pyramid shape having a quadrangular base when viewed in a plan view. In such an embodiment, light reflected or dispersed from a first groove 210 may be re-reflected or re-dispersed from a surface of the quadrangular pyramid shape to be dissipated upwardly through a light guide plate 150.

In an exemplary embodiment, as shown in FIGS. 5A and 5B, the second grooves 310 may have the triangular pyramid shape or the quadrangular pyramid shape, but the shape of the second groove 310 of the invention is not limited thereto. In an alternative exemplary embodiment, the second groove 310 may have a polygonal pyramid shape having a polygonal base when viewed in a plan view and a predetermined height from the base.

According to exemplary embodiments, a second groove 310 may have a circular or polygonal base when viewed in a plan view and a top parallel to the base while having a shape corresponding to the base and a predetermined height therefrom. In an exemplary embodiment, the second groove 310 may have a truncated pyramid shape.

Figure 6A:
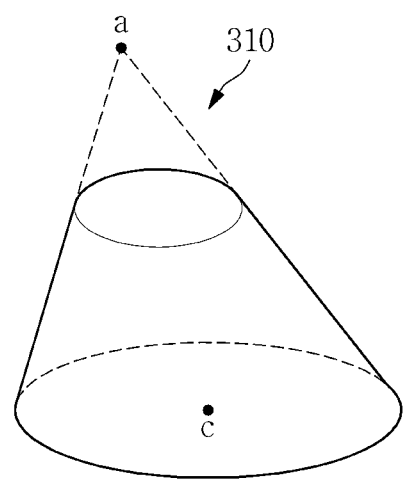
Figure 6B:
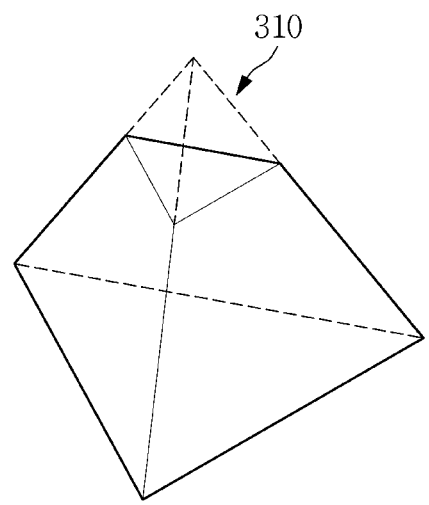

Referring to FIG. 6A, in an exemplary embodiment, a second groove 310 may have a circular cone shape having a circular base and a circular top parallel thereto. In an alternative exemplary embodiment, referring to FIG. 6B, a second groove 310 may have a triangular pyramid shape having a triangular base and a triangular top parallel thereto. However, the shape of the second groove 310 is not limited to those shown in FIGS. 6A and 6B. In an alternative exemplary embodiment, the second groove 310 may have a polygonal pyramid shape as described above.

Figure 7:
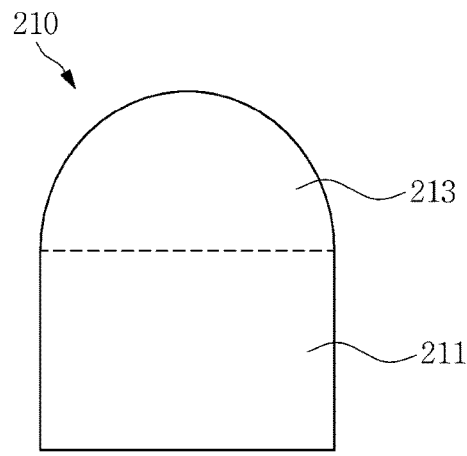
FIG. 7 is a view illustrating a first groove according to an exemplary embodiment of the invention.

Hereinafter, a first groove 210 will be described in greater detail with reference to FIG. 7. FIG. 7 is a view illustrating the first groove 210 according to an exemplary embodiment. The first groove 210 may include a lower portion 211 and an upper portion 213 on the lower portion 211 based on a lower surface of a light guide plate 150.

The lower portion 211 may have a circular cylinder shape. Accordingly, the lower portion 211 may have a predetermined height from a base thereof. The height of the lower portion 211 may be associated with a depth of the first groove 210. In such an embodiment, the depth of the first groove 210 may be determined based on the height of the lower portion 211.

The upper portion 213 may have a semi-spherical shape. In such an embodiment, the semi-spherical shape may be formed to be convex upwardly toward the light guide plate 150. As described above, the upper portion 213 may reflect or disperse a light incident on and transmitted into the light guide plate 150. The light may reach a second groove 310 to be re-reflected or re-dispersed therefrom, whereby a path of the light may be shifted upwardly toward the light guide plate 150. In an alternative exemplary embodiment, the upper portion 213 may have a semi-elliptical shape formed to be convex upwardly toward the light guide plate 150.

Figure 8A:
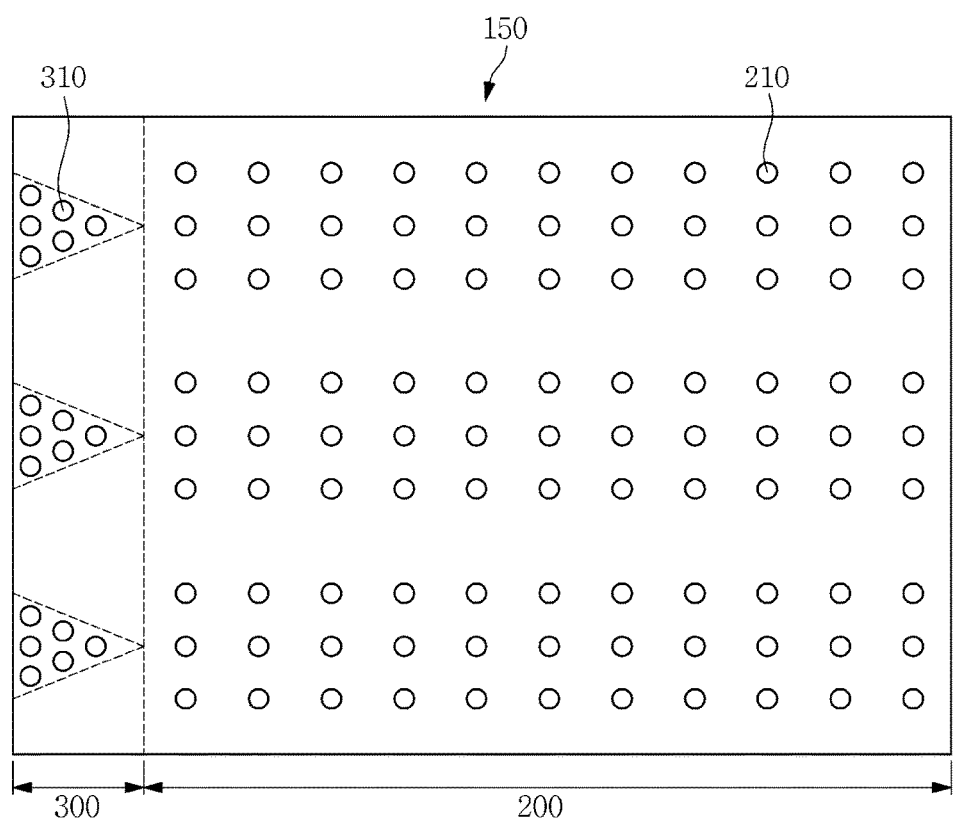
FIGS. 8A, 8B, and 8C are views illustrating first light collecting patterns according to various exemplary embodiments of the invention, respectively.
Figure 8B:
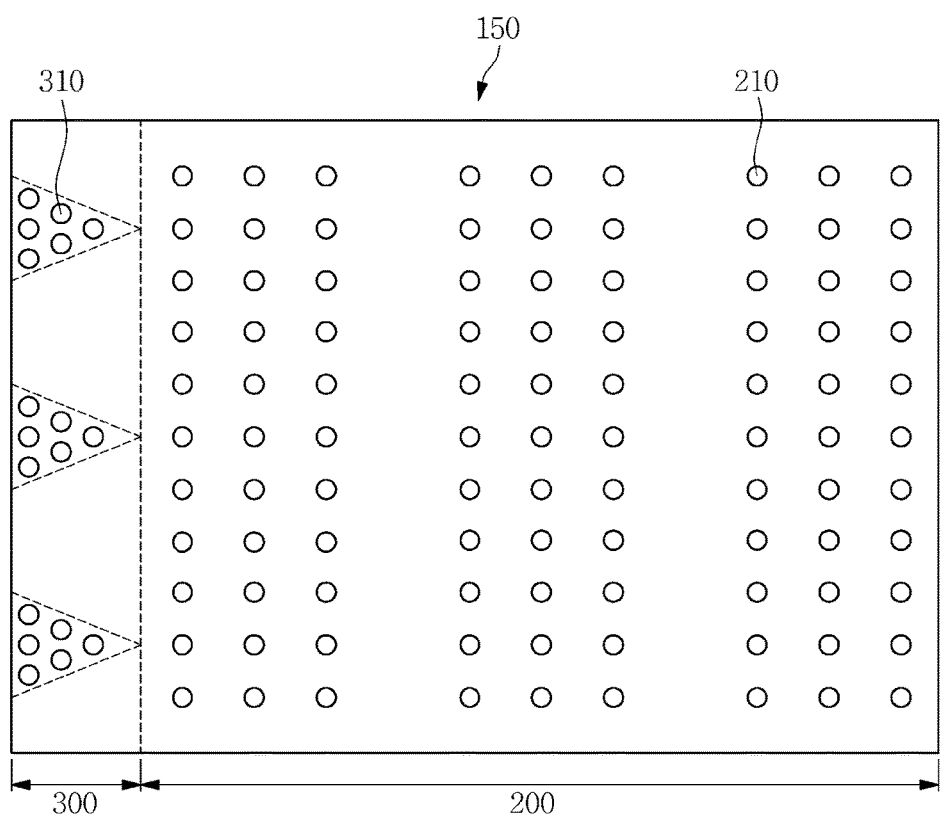
Figure 8C:
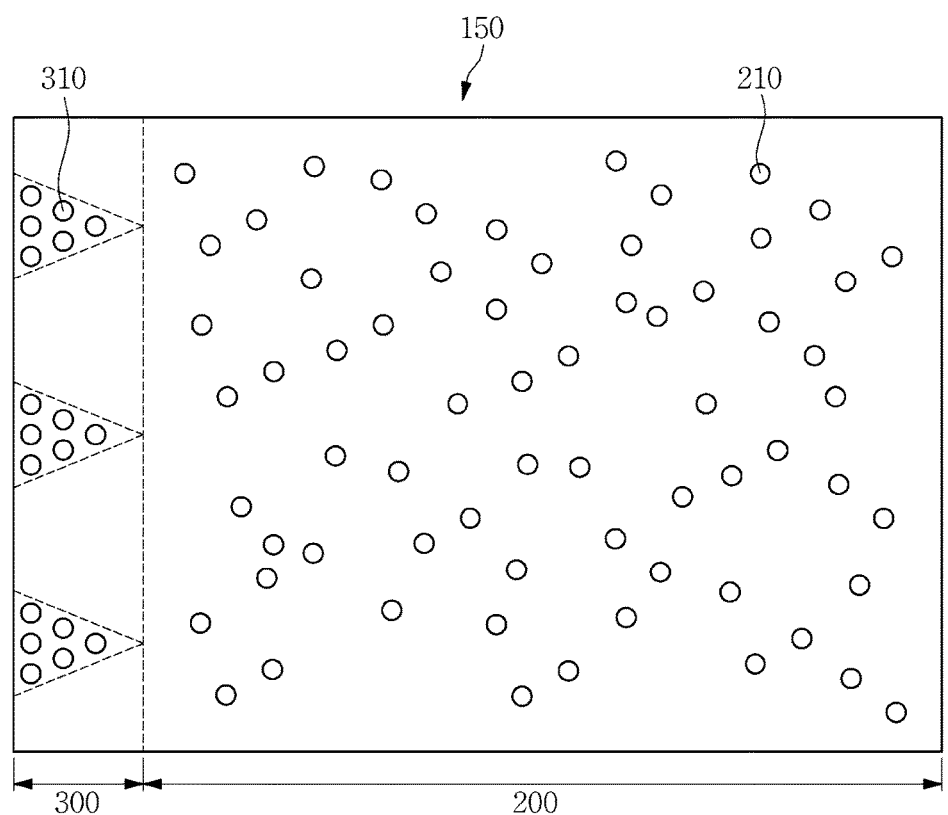

The first groove 210 and the second groove 310 may be arranged on the lower surface of the light guide plate 150, and define a first light collecting pattern 200 and a second light collecting pattern 300, respectively. The first light collecting pattern 200 and the second light collecting pattern 300 will hereinafter be described in greater detail with reference to FIGS. 2, 8A, 8B and 8C. FIGS. 8A, 8B and 8C are views illustrating first light collecting patterns 200 according to various exemplary embodiments, respectively.

Referring back to FIG. 2, the second groove 310 may be arranged on the lower surface of the light guide plate 150 to be disposed between the light sources 161. As the number of the light sources 161 decreases, a gap 'g' between adjacent light sources 161 may increase. In an exemplary embodiment, a dark area may be formed in the gap 'g' between the light sources 161. In an exemplary embodiment, as shown in FIG. 2, the second groove 310 may be disposed between the light sources 161 and thereby the dark area may be removed, such that a hot spot phenomenon may be substantially reduced or mitigated.

In an exemplary embodiment, the second grooves 310 may be arranged in a manner in which the number of the second grooves 310 decreases as further away from the light source module 160. In such an embodiment, the second groove 310 may be arranged in a triangular shape when viewed in a plan view, corresponding to the gap 'g' between the light sources 161.

The light from the light source 161 may be spatially diffused while being emitted from the light source 161 and being incident on the light guide plate 150. Accordingly, the reflection or dispersion of the light may occur by the second groove 310 in a light incident portion of the light guide plate 150 adjacent to the light source 161.

In an exemplary embodiment, the reflection or dispersion of the light occurring in the light incident portion of the light guide plate 150 may be effectively prevented by the second grooves 310 disposed between the light sources 161 in the manner in which the number of the second grooves 310 decreases as further away from the light source module 160.

Accordingly, in such an embodiment, the dissipation of the light outwardly of the light guide plate 150 may be effectively prevented.

The first grooves 210 may be arranged in a length direction of the light guide plate 150 from a position of the second light collecting pattern 300. The first grooves 210 may be arranged in a regular or irregular manner. Referring to FIG. 8A, in an exemplary embodiment, the first grooves 210 may be arranged in a length direction of a light guide plate 150, corresponding to a second groove 310. Referring to FIG. 8B, first grooves 210 may be arranged in a row on a light guide plate 150 in a length direction of a light source module 160. However, the arrangement of the first grooves 210 is not limited thereto. Referring to FIG. 8C, first grooves 210 may be arranged in an irregular manner from a position of a second light collecting pattern 300 in a length direction of a light guide plate 150.

In an exemplary embodiment, the first grooves 210 may be arranged on the lower surface of the light guide plate 150 in any manner insofar as the purposes and effects of the invention can be achieved.

As set forth above, according to exemplary embodiments of the invention, the light emitted from the light source to be incident on the light guide plate is reflected or dispersed at the first groove. The light reflected or dispersed from the first groove may be re-reflected or re-dispersed at the second groove to be dissipated upwardly through the light guide plate.

Accordingly, in such embodiments, the second groove disposed between the light sources may collect the dispersed light and the collected light may be dissipated upwardly through the light guide plate, such that an amount of light emitted from the dark area may be increased. Thus, the hot spot phenomenon may be effectively prevented or mitigated.

From the foregoing, it will be appreciated that various embodiments in accordance with the disclosure have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A backlight unit comprising:
a lower case comprising a bottom portion and a side portion on an edge of the bottom portion;
a light guide plate accommodated in the lower case; and
a light source module comprising:
a circuit board between the light guide plate and the side portion of the lower case; and
a light source on the circuit board,
wherein the light guide plate comprises:
a first light collecting pattern on a lower surface of the light guide plate; and
a second light collecting pattern on the lower surface of the light guide plate and between the light source module and the first light collecting pattern,
the first light collecting pattern comprises a first groove defined in a negative pattern,
the second light collecting pattern comprises a second groove defined in a negative pattern, and
the first groove has a depth less than a depth of the second groove.

2. The backlight unit of claim 1, wherein
the light source module comprises a plurality of light sources, and
the second groove is disposed between adjacent light sources.

3. The backlight unit of claim 2, wherein the second grooves are arranged in a triangular shape when viewed from a plan view.

4. The backlight unit of claim 3, wherein the second grooves are arranged in a manner in which a number of the second grooves decreases as being further away from the light source module.

5. The backlight unit of claim 1, wherein the second groove has a circular cone shape.

6. The backlight unit of claim 5, wherein the second groove has an oblique circular cone shape.

7. The backlight unit of claim 6, wherein a vertex of the second groove is positioned between a center of a base of the oblique circular cone shape and the light source module.

8. The backlight unit of claim 1, wherein the second groove has a polygonal pyramid shape.

9. The backlight unit of claim 1, wherein the second groove has a truncated cone or pyramid shape.

10. The backlight unit of claim 1, wherein the first groove is divided into a lower portion having a cylindrical shape and an upper portion having a semi-spherical shape, based on the lower surface of the light guide plate.

11. The backlight unit of claim 10, wherein the first grooves are arranged in an irregular manner when viewed from a plan view.

12. A display device comprising:
an upper case;
a display panel below the upper case;
an optical sheet below the display panel;
an intermediate case in which the display panel and the optical sheet are accommodated;
a lower case comprising a side portion coupled to the intermediate case;
a light guide plate accommodated in the lower case; and
a light source module comprising:
a circuit board between the light guide plate and the side portion of the lower case; and
a light source on the circuit board,
wherein the light guide plate comprises:
a first light collecting pattern on a lower surface of the light guide plate; and
a second light collecting pattern on the lower surface of the light guide plate and between the light source module and the first light collecting pattern,
wherein
the first light collecting pattern comprises a plurality of first grooves each having substantially a same depth,
the second light collecting pattern comprises a plurality of second grooves each having substantially a same depth different the depth of the first grooves, and
all of the second groves are disposed closer to the light source module than all of the first grooves.

13. The display device of claim 12, wherein
the first light collecting pattern comprises a first groove defined in a negative pattern, and
the second light collecting pattern comprises a second groove defined in a negative pattern.

14. The display device of claim 13, wherein the first groove has a depth less than a depth of the second groove.

15. The display device of claim 14, wherein
the light source module comprises a plurality of light sources, and the second groove is disposed between adjacent light sources.

16. The display device of claim 14, wherein the second groove has a circular cone shape.

17. The display device of claim 16, wherein the second groove has an oblique circular cone shape, and a vertex of the second groove is positioned between a center of a base of the oblique circular cone shape and the light source module.

18. The display device of claim 14, wherein the first groove is divided into a lower portion having a cylindrical shape and an upper portion having a semi-spherical shape, based on the lower surface of the light guide plate.

19. The backlight unit of claim 1, wherein the number of the second groove is less than the number of the first groove.

* * * * *